US006775892B2

(12) United States Patent
Cotter

(10) Patent No.: US 6,775,892 B2
(45) Date of Patent: Aug. 17, 2004

(54) RETAINING RING INSTALLATION TOOL

(75) Inventor: Jonathan P. Cotter, Dearborn, MI (US)

(73) Assignee: Diebolt International, Inc., Plymouth, MI (US)

(*) Notice: Subject to any disclaimer, the term of this patent is extended or adjusted under 35 U.S.C. 154(b) by 251 days.

(21) Appl. No.: 09/746,795

(22) Filed: Dec. 22, 2000

(65) Prior Publication Data

US 2002/0078547 A1 Jun. 27, 2002

(51) Int. Cl.[7] .................................... B23P 19/04
(52) U.S. Cl. .................................... 29/268
(58) Field of Search .................... 29/222, 223, 268, 29/267, 229, 243.56, 235

(56) References Cited

U.S. PATENT DOCUMENTS

| | | | |
|---|---|---|---|
| 346,608 A | 8/1886 | Ring | |
| 530,361 A | 12/1894 | Smith et al. | |
| 1,151,712 A | 8/1915 | Phillips | |
| 1,316,409 A | 9/1919 | Bahre | |
| 2,154,580 A | 12/1936 | Perrin | |
| 2,583,876 A | 10/1950 | Penkauskas | |
| 2,710,520 A | 6/1955 | Selzler et al. | |
| 2,995,340 A | 8/1961 | Richarson | |
| 3,577,848 A | 5/1971 | Mengle | |
| 4,649,618 A | 3/1987 | Harrison | |
| 4,813,120 A | 3/1989 | Fournier | |
| 5,456,144 A | * 10/1995 | Dahl et al. | 29/268 |
| 5,974,646 A | 11/1999 | Cotter | |

* cited by examiner

*Primary Examiner*—Robert C. Watson
(74) *Attorney, Agent, or Firm*—Reising, Ethington, Barnes, Kisselle, P.C.

(57) ABSTRACT

A tool to install a retaining ring into a groove in a cylinder has a handle lever which carries an adjustable gripper constructed to engage the cylinder and a compressing lever constructed to engage a portion of the retaining ring with the compressing lever pivotally and slidably connected to the handle lever permitting relative movement between the two levers. The connection between the handle lever and the compressing lever permits them to be separated and joined together in a fashion that facilitates engaging and compressing the retaining ring for insertion into the cylinder.

11 Claims, 3 Drawing Sheets

RETAINING RING INSTALLATION TOOL

FIELD OF THE INVENTION

This invention relates to fluid cylinders such as gas springs, accumulators and hydraulic cylinders and more particularly to an apparatus to install a retaining ring into a cylinder.

BACKGROUND OF THE INVENTION

Typically, gas springs, accumulators, and pneumatic and hydraulic cylinders utilize a round spring steel wire retaining ring to retain a seal and bearing assembly which provides a seal and bearing surface adjacent the piston or piston rod and also retains the piston or piston rod within the cylinder. The retaining ring is usually received in a radius groove machined near the open end and in the interior surface of the cylinder. The retaining ring bears on a shoulder provided by the groove and the seal and bearing housing bears on the opposite face of the retaining ring to retain the seal and bearing assembly within the cylinder.

During assembly of a fluid cylinder, it is necessary to install the retaining ring into the groove within the cylinder. Retaining rings are typically difficult to compress, and thus, difficult to install. Tapered sleeves and accompanying pushers received in the tapered sleeves to drive the ring through the sleeve and into the cylinder have been used to facilitate installation of retaining rings in the past, but this requires expensive turned and heat treated parts and considerable operator skill, experience and judgment to successfully and safely install the retaining rings. Also, for different sizes of cylinders and retaining rings, different sizes of tapered sleeves and pushers are required further increasing the cost of this assembly method. For small cylinders and retaining rings the pusher may be driven by striking it with a heavy mallet to drive the retaining ring into a narrower portion of the sleeve and thereby compress the ring. However, larger cylinders require use of an arbor or hydraulic press to drive the pusher for installation of the retaining ring increasing the cost, time and labor needed to install each retaining ring.

SUMMARY OF THE INVENTION

A tool to install a retaining ring into a groove in a cylinder has a handle lever which carries an adjustable gripper constructed to engage the cylinder and a compressing lever constructed to engage a portion of the retaining ring with the compressing lever pivotally and slidably connected to the handle lever permitting relative movement between the two levers. The connection between the handle lever and the compressing lever permits them to be separated and joined together in a fashion that facilitates engaging and compressing the retaining ring for insertion into the cylinder.

To install a retaining ring into a cylinder, a portion of the retaining ring is disposed in the cylinder with another portion of the ring extending out of the cylinder. The compressing lever is then engaged with the retaining ring and pivoted towards the handle lever. A link connected between the handle lever and compressing lever slidably advances the compressing lever as it is pivoted towards the handle lever to compress the retaining ring to a size permitting the ring to fit within the cylinder. With the retaining ring compressed, a rubber mallet or other device is used to remove the retaining ring from the tool and dispose it in the groove in the cylinder.

The retaining ring installation tool permits safe, easy and quick installation of the retaining ring into the cylinder and requires relatively low force and a relatively low level of skill to use. Desirably, the tool is adjustable for use with a variety of sizes of retainer rings.

Objects, features and advantages of this invention include providing a tool to facilitate installation of a retaining ring into a groove in a cylinder which is formed from low cost materials, requires a relatively low level of skill to operate, requires relatively little force to install retaining rings, is adjustable for use with a variety of sizes of retaining rings, eliminates the need for expensive tapered sleeves and pushers, eliminates the need for a press to drive a pusher, utilizes an over-center toggle to hold a compressed retaining ring, is compact, of relatively simple design and economical manufacture and assembly, and in service has a long and useful life.

BRIEF DESCRIPTION OF THE DRAWINGS

These and other objects, features and advantages of this invention will be apparent from the following detailed description of the preferred embodiments and best mode, appended claims, and accompanying drawings in which:

DETAILED DESCRIPTION OF THE PREFERRED EMBODIMENT

Figures 1, 2, 3:
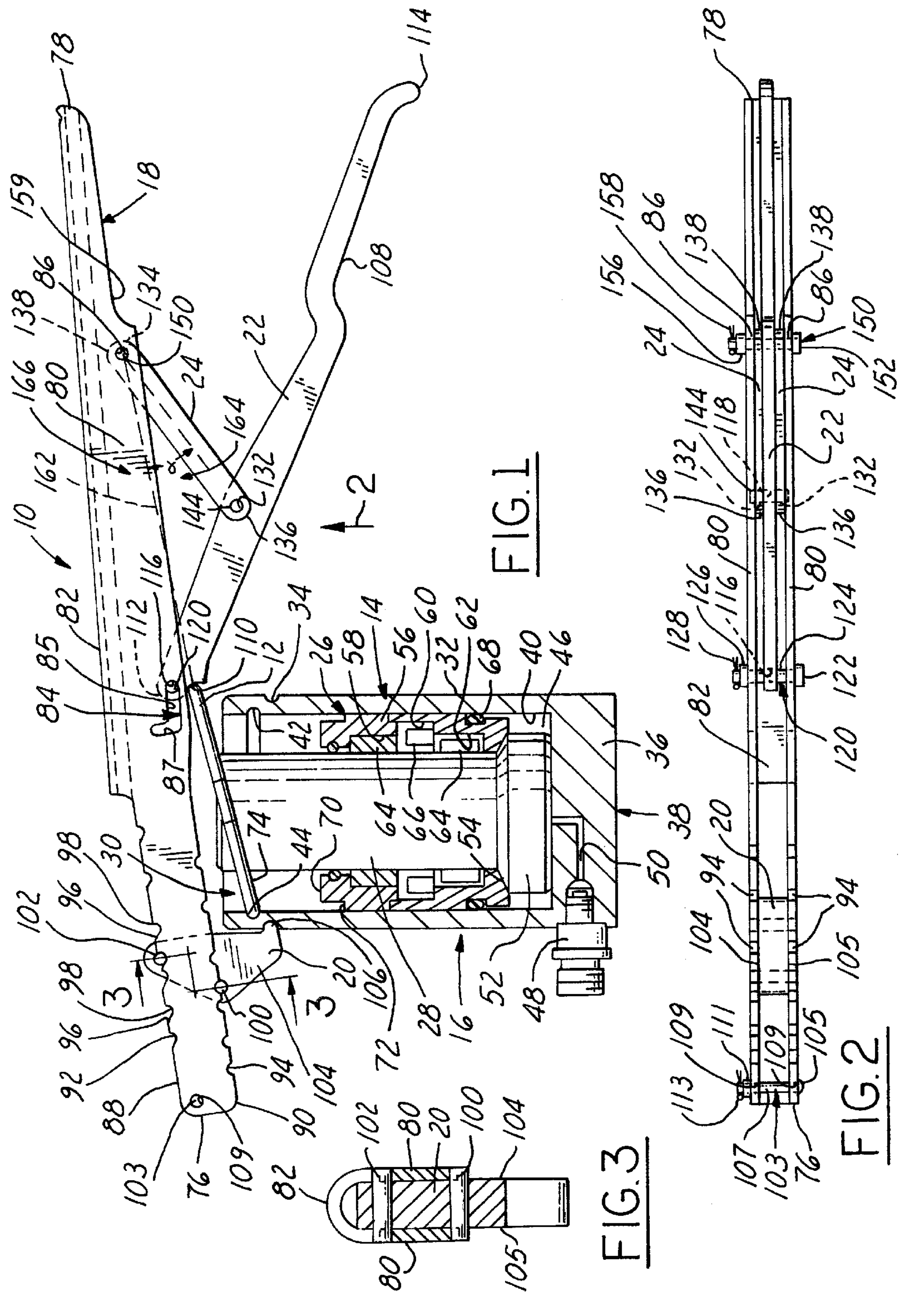
FIG. 1 is a sectional view of a gas spring illustrating a retaining ring installation tool embodying the invention in a first position initially engaged with the retaining ring of the gas spring.
FIG. 2 is a bottom view of the retaining ring installation tool embodying the invention in a fully collapsed position.
FIG. 3 is a sectional view taken along line 3—3 of FIG. 1.

Referring in more detail to the drawings, FIG. 1 shows a tool 10 for installing a retaining ring 12 into a cylinder body 14 of a gas spring 16. The tool 10 has a handle lever 18 carrying a gripper 20 that engages the cylinder body 14, a ring compressing lever 22 slidably and pivotally carried by the handle lever 18 to engage and compress the retaining ring 12, and a pair of links 24 connected between the levers 18, 22 to slidably displace the compressing lever 22 as it is pivoted relative to the handle lever 18. The gripper 20 is adjustably carried by the handle lever 18 so that the tool 10 can accommodate a variety of retaining ring diameters.

As shown in FIG. 1, the gas spring 16 has a sealing and bearing assembly 26 received within the cylinder body 14 of the gas spring 16 and a piston rod 28 slidably received in the sealing and bearing assembly 26 for axial reciprocation. The cylinder 14 has an open end 30 with a circumferentially continuous sidewall 32 preferably having a first annular groove 34 in the exterior of the sidewall 32 and a base 36 preferably integrally formed with the sidewall 32 and closing one end 38 of the cylinder body 14. The interior wall 40 of the cylinder body 14 has a second annular groove 42 formed to provide a shoulder or stop surface 44 which is engaged by the retaining ring 12 when received in the second groove 42. The retaining ring 12 is split, may be either annular or C-shaped, and typically in cross section is round with a diameter of at least ⅛ of an inch, and made of spring steel. To admit gas into a gas chamber 46 defined by the cylinder body 14, the piston rod 28 and the sealing and bearing assembly 26, a filler valve 48 is threadably received within the base 36 in communication with a fill passage 50 through which gas flows into the gas chamber 46.

The piston rod 28 is an elongated cylindrical member having an enlarged end portion or piston 52 preferably integrally formed with the piston rod 28 and received within the gas chamber 46. The enlarged diameter piston 52 has a shoulder 54 which bears on the sealing and bearing assembly 26 when the piston rod 28 is at its fully extended position to retain the piston rod 28 within the cylinder body 14.

The sealing and bearing assembly 26 has an annular retaining member 56 slidably received in the cylinder body 14 and having several annular grooves 58, 60, 62 formed in its interior surface. Bearing rings 64 are received in grooves 58 and 62, and a sealing member 66 is received in groove 60. The bearing rings 64 guide the piston rod 28 for axial reciprocation and the sealing member 66 provides a tight seal between the piston rod 28 and the retaining member 56. An O-ring seal 68 received in an annular groove provides a gas tight seal between the retaining member 56 and the interior wall 40 of the cylinder body 14 to prevent gas from leaking out of the gas chamber 46. To releasably retain the retaining member 56 within the cylinder body 14 the retaining member 56 has an upstream end 70 with an annular shoulder 72 constructed to engage the lower surface 74 of the retaining ring 12 which itself is engaged with the stop surface 44 formed by the second groove 42.

The handle lever 18 is generally channel-shaped, as shown in FIG. 2, having a first end 76 and a second end 78, a pair of laterally spaced apart sidewalls 80 and an upper wall 82 interconnecting the sidewalls 80 along a portion of their length. The sidewalls 80 extend beyond the upper wall 82 to the first end 76 of the handle lever 18. The sidewalls 80 have aligned L-shaped slots 84 between the first and second ends 76, 78, and aligned openings 86 between the slots 84 and the second end 78. The L-shaped slots 84 have a longitudinal portion 85 and a transverse portion 87.

For releasably and adjustably receiving the gripper 20 to accommodate a range of cylinder body and retaining ring diameters, the handle lever 18, adjacent the first end 76, has a plurality of notches 92 along the top surface 88 of the sidewalls 48 and a plurality of notches 94 along their bottom surfaces 90. The notches 92 have an entrance portion 96 which facilitates adjusting the gripper 20 and a shoulder 98 which retains the gripper 20 in a desired position in use. To permit the gripper 20 to be slidably adjusted along the sidewalls 80 and the pins 100, 102 to be seated in different notches 94, 92 respectively, the notches 92 in the top surface 88 are preferably offset from the notches 94 in the bottom surface 90. This permits the gripper 20 to be rotated or pivoted relative to a pin 100 supporting the gripper 20 in one of the notches 94 to remove a pin 102 also supporting the gripper 20 from its notch 92 by way of its entrance portion 96.

A spacer pin 103 limits separation of the sidewalls 80 and retains the gripper 20 on the handle lever 18. The pin 103 has an enlarged head 105 and shank 107 extending through aligned openings 109 in the sidewalls 80 adjacent the first end 76 of the handle lever 18. After insertion of the spacer pin 103 through the openings 109, an annular washer or spacer 111 is disposed on the shank 107 and a cotter pin 113 is inserted through an opening in the shank 107 to removably retain and prevent inadvertent removal of the spacer pin 103. The handle lever 18 is preferably formed from a single piece of sheet steel which is laser-beam, high pressure water or otherwise cut or stamped and then formed into the final shape.

The gripper 20 has a pair of opposed sides 104, 105 and a hook 106 at one end facing generally in the direction of the second end 78 of the handle lever 18. The pair of pins 100, 102 are press fit through the gripper and extend beyond the opposed sides 104, 105 to engage and seat in the notches 94, 92, respectively. As discussed above, the notches 92, 94 are constructed and arranged to allow the gripper 20 to be easily adjusted along the sidewalls 80 without having to remove the pins 100, 102 from the gripper 20. The gripper 20 locates and anchors the tool 10 to the cylinder body 14 against the reactive force the retaining ring 12 exerts on the tool 10 as the retaining ring 12 is compressed. Preferably, this is accomplished by disposing the hook 106 in the external groove 34 in the cylinder body 14.

The compressing lever 22 is an elongate member received between the sidewalls 80 of the handle lever 18. The compressing lever 22 preferably has a handle portion 108 offset from the longitudinal axis of the compressing lever 22 to more comfortably receive the fingers of the operator on the tool 10. The compressing lever 22 has an arcuate, recessed ring-engaging surface 110 at a first end 112 and the handle portion 108 at a second end 114 with a first opening 116 and a second opening 118 between the first and second ends 112, 114 for attachment to the handle lever 18 and the pair of links 24, respectively. The compressing lever 22 is slidably and pivotally attached to the handle lever 18 in the slots 84 of the handle lever 18 by a first pivot pin 120. As shown in FIG. 2, the first pivot pin 120 has an enlarged head 122 and a shank 124 with the shank 124 extending through the slot 84 in one side wall 80 of the handle lever 18, the first opening 116 in the compressing lever 22, and the slot 84 in the other side wall 80 of the handle lever 18. An annular washer or spacer 126 is then disposed on the shank 124 and a cotter pin 128 is inserted through an opening in the shank 124 to releasably retain and prevent inadvertent removal of the first pivot pin 120. The compressing lever 22 is preferably formed from a heat-treatable alloy steel and is laser-beam, high pressure water or otherwise cut or machined and may thus be manufactured at a relatively low cost even in low volume.

To facilitate attachment to the compressing lever 22 and the handle lever 18, each link 24 has a pair of openings 132 and 134, adjacent opposed ends 136 and 138. The opening 132 in the first end 136 of each link 24 is aligned with the second opening 118 in the compressing lever 22, with one link 24 on each side of the compressing lever 22. A second pivot pin 144, which may be a standard rivet, is inserted through the aligned openings 132, 118 in the links 24 and the compressing lever 22, respectively. The opening 134 in the second end 138 of each link 24 is aligned with the pair of openings 86 in the sidewalls 80 of the handle lever 18 with each link 24 adjacent a separate one of the sidewalls 80. To connect the links 24 and handle lever 18, a third pivot pin 150 with an enlarged head 152 at one end is inserted through one opening 86 in a side wall 80, the openings 134 in both links 24, and the opening 86 in the other sidewall 80. An annular washer or spacer 156 is then disposed on the pin 150 and a cotter pin 158 is inserted through an opening in the pin 150. The links 24 are disposed at an acute included angle relative to the handle lever 18 when the compressing lever 22 is in the first position. Desirably, the handle portion 108 of the compressing lever 22 provides clearance from the pivot pin 150 to permit the compressing lever to be fully collapsed against the handle lever 18. Correspondingly, the handle lever 18 preferably has a relieved portion 159 aligned with the handle portion 108 of the compressing lever 22.

Operation

To install a retaining ring 12 into a gas spring 16, the internal components of the gas spring 16 are first assembled into the cylinder body 14. The gripper 20 on the tool 10 is slidably adjusted on the handle lever 18 to the notches 92, 94 appropriate for the size of the cylinder body 14 and the retaining ring 12 to be installed therein. A portion of the retaining ring 12 is then placed into the second groove 42 inside the cylinder body 14 of the gas spring 16 with an opposite portion of the retaining ring 12 extending out of the open end 30 of the cylinder body 14.

Figure 4:
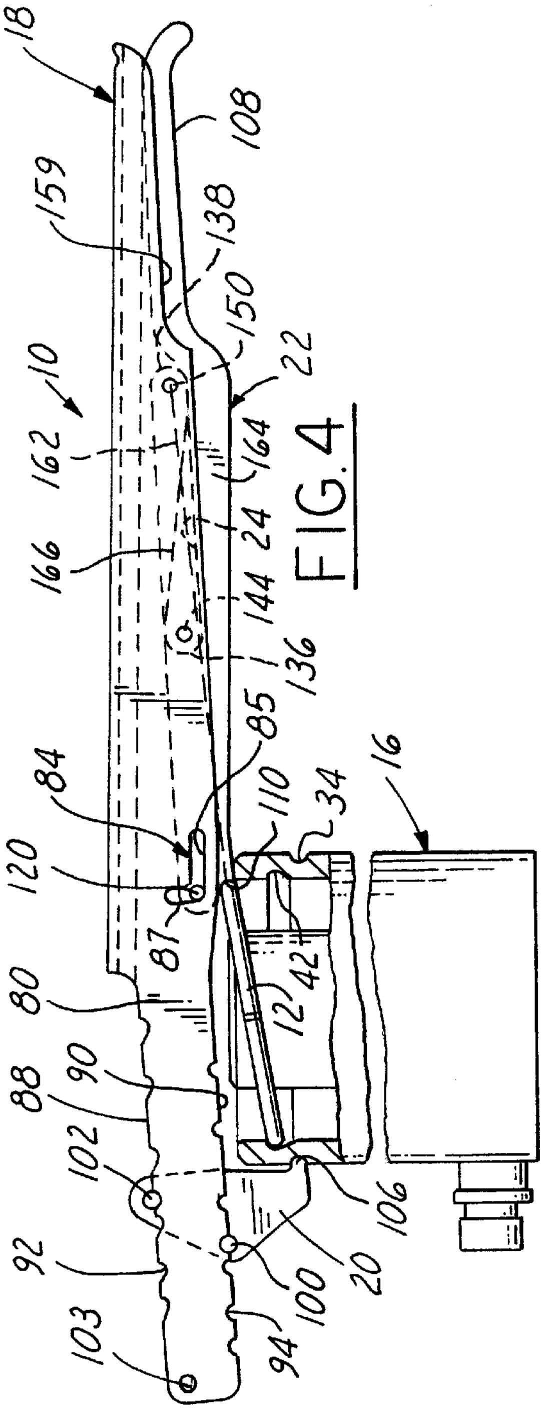
FIG. 4 is a partial sectional view of the gas spring of FIG. 1 illustrating the retaining ring installation tool in a second position fully engaged with and compressing the retaining ring of the gas spring.

The tool 10 is then placed over the retaining ring 12 and the hook 106 of the gripper 20 is inserted into the first groove 34 in the exterior of the sidewall 32 of the cylinder body 14. The hook 106 is positioned generally on the same side of the cylinder body 14 as the portion of the retaining ring 12 that is in the second groove 42 inside the cylinder body 14. With the compressing lever 22 in its first position, as shown in FIG. 1, the engaging surface 110 is brought into engagement with the portion of the retaining ring 12 extending out of the cylinder body 14. To compress the retaining ring 12, the operator of the tool 10 manually displaces the compressing lever 22 toward the handle lever 18 causing the compressing lever 22 to pivot counter clockwise about the first pivot pin 120, as viewed in FIG. 1, and the links 24 to pivot clockwise about the third pivot pin 150, as viewed in FIG. 1. Clockwise pivotal movement of the links 24 causes sliding movement of the first pivot pin 120 and the compressing lever 22 in the slots 84 toward the first end 76 of the handle lever 18. The sliding movement is a function of the cosine of the angle $\propto$ (FIG. 1) spanned by the movement of the links 24. The sliding movement of the compressing lever 22 compresses the retaining ring 12 between the engaging surface 110 and the internal wall 40 so that it may be received in the cylinder body 14. As shown in FIG. 4, when the compressing lever 22 is in its second position, the first pivot pin 120 is fully forward in the horizontal portion 85 of the L-shaped slots 84 so that the retaining ring 12 is sufficiently compressed and may be received in the open end 30 of the cylinder body 14.

As shown in FIG. 1, the engaging surface 110 of the compressing lever 22 and the third pivot pin 150 form an imaginary straight line 162. When the compressing lever 22 is in its first position, the second pivot pin 144 is on one side 164 of the line 162, and, as shown in FIG. 4, when the compressing lever 22 is in its second position, the second pivot pin 144 passes to the other side 166 of the line 162 providing an over-center toggle movement. Hence, the reactive force of the compressed retaining ring 12 on the compressing lever 22 tends to displace the compressing lever 22 towards the handle lever 18 to facilitate maintaining the compressing lever 22 in its second position compressing the retaining ring 12. The compressing lever 22 tends to stay in the second position until an outside force acts on the compressing lever 22 tending to separate it from the handle lever 18. With the compressing lever 22 tending to remain in the second position, the gripping force applied to the tool 10 by the user can be released or at least reduced as the spring force from ring 23 locks the level 22 in a closed position.

Figure 5:
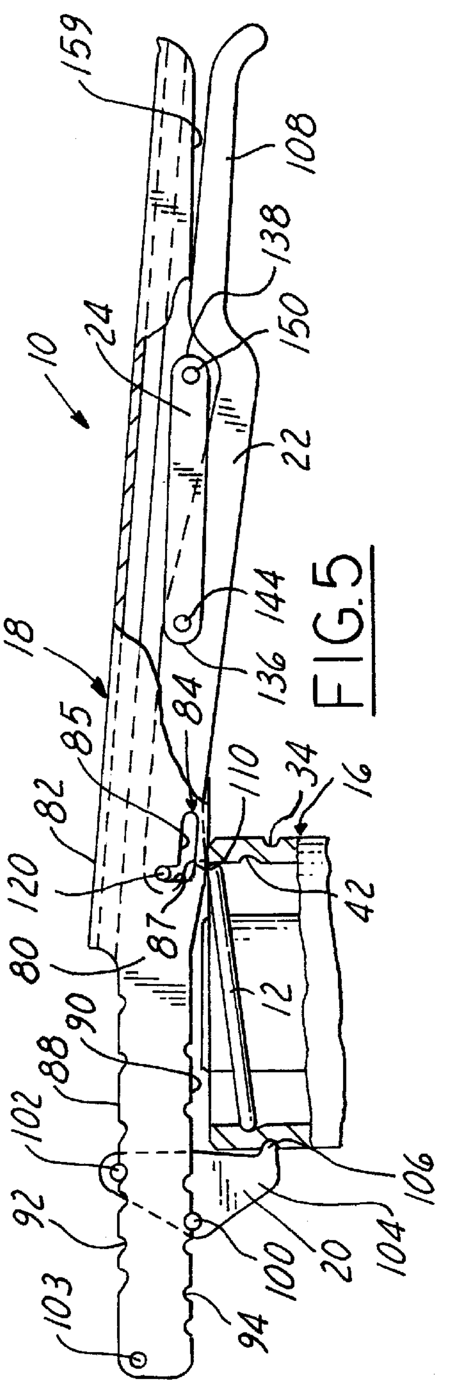
FIG. 5 is a partial sectional view as in FIG. 4 illustrating the tool in a third, fully collapsed position with the retaining ring compressed and received in the cylinder.
Figure 6:
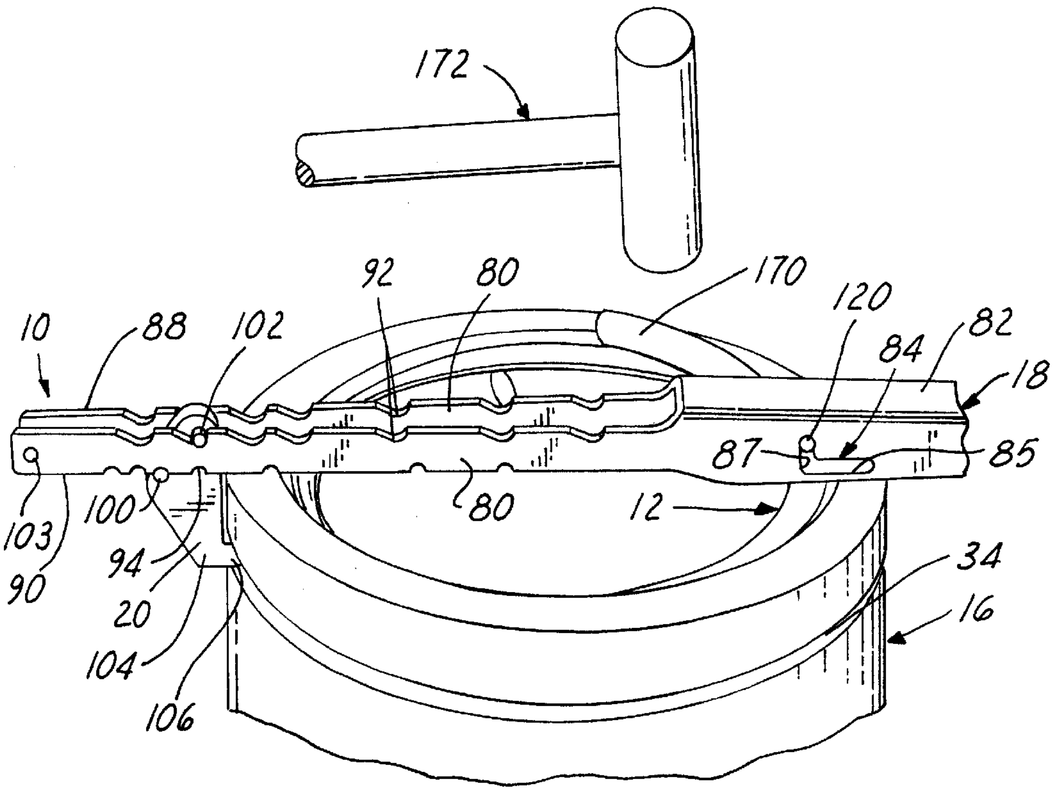
FIG. 6 is a fragmentary perspective view of the retaining ring installation tool, retaining ring and cylinder in the position of FIG. 5.

To disengage the compressed retaining ring 12 from the tool 10, the tool 10 is pivoted about the hook 106 (clockwise as viewed in FIG. 5). Such movement forces the edge of the retaining ring 12 into the cylinder body 14, causes the first pivot pin 120 and associated end of the compressing lever 22 to move upwardly into the vertical portion 87 of the L-shaped slots 84, disengages the engaging surface 110 from the retaining ring 12 after it is forced into the cylinder body 14 and engages the bottom surface 90 of the sidewalls 80 with the upper surface of the retaining ring 12 and the cylinder body 14 to maintain the retaining ring 12 in the cylinder body 14 with a portion above the groove 42. Desirably, the tool 10 can be manually operated with one hand so that the operator's other hand may be used to drive the retaining ring 12 into the groove 42 in the cylinder body 14. This may be accomplished by striking a portion 170, as shown in FIG. 6, of the retaining ring 12 with a hammer or mallet 172. It may be necessary to use the mallet to remove the retaining ring 12 from the engaging surface 110. To do this, the upper wall 82 of the tool 10 may be struck by the mallet or the ring itself may be struck by the mallet. Striking the upper wall 82 with the mallet may also seat the ring 12 in the second groove 42. In any event, once the retaining ring 12 is fully inside the cylinder body 14, it can be manipulated to fully seat it in the second groove 42 in the cylinder body 14. The tool 10 is then manually removed from the gas spring 16. With the retaining ring 12 fully seated in the second groove 42, the gas spring 16 is fully assembled and may be filled with pressurized gas for use.

The increased mechanical advantage provided by the tool 10 enables quick and easy installation of various sizes of retaining rings into a cylinder body. The tool 10 may be manufactured at low cost even in small production runs and in service has a long useful life.

What is claimed is:

1. A retaining ring installation tool, comprising:

a handle lever having a first end and a second end with a slot between the first end and second end;

a gripper carried by the handle lever between the slot and the first end of the handle lever and engageable with a sidewall of a cylinder;

a compressing lever connected to the handle lever for movement between first and second positions with a portion slidably and pivotally connected in the slot of the handle lever, the compressing lever having a ring engaging surface for releasably receiving a portion of a retaining ring; and a link pivotally connected to the handle lever and operably connecting the compressing lever to the handle lever whereby when the compressing lever is moved relative to the handle lever from its first position toward its second position, the link slidably displaces the compressing lever in the slot to advance the ring engaging surface and compress the retaining ring.

2. The retaining ring installation tool of claim 1 wherein the link is connected to the handle lever between the slot and second end of the handle lever.

3. The retaining ring installation tool of claim 1 wherein the compressing lever has a first end and a second end with the second end spaced from the handle lever in the first position of the compressing lever and received adjacent to the handle lever in the second position of the compressing lever.

4. The retaining ring installation tool of claim 1 wherein the slot has a longitudinal portion and a transverse portion and the compressing lever moves along the transverse portion of the slot to disengage the retaining ring from the ring engaging surface.

5. The retaining ring installation tool of claim 1 wherein the link is pivotally connected to the compressing lever, and the compressing lever rotates in a first direction from its first position to its second position and the link rotates in a direction opposed to the first direction during movement of the compressing lever from its first position to its second position.

6. A retaining ring installation tool, comprising:

a handle lever having a first end and a second end with a slot between the first end and second end;

a compressing lever connected to the handle lever for movement between first and second positions with a portion slidably and pivotally connected in the slot of the handle lever, the compressing lever having a ring engaging surface for releasably receiving a portion of a retaining ring;

a gripper having a hook with the gripper adjacent to the first end of the handle lever such that the hook faces generally in the direction of the second end of the handle lever; and a link pivotally connected to the handle lever and operably connecting the compressing lever to the handle lever whereby when the compression lever is moved relative to the handle lever from its first position toward its second position, the link slidably displaces the compressing lever in the slot to advance the ring engaging surface and compress the retaining ring.

7. The retaining ring installation tool of claim 6 which also comprises a plurality of spaced apart adjustment notches adjacent to the first end of the handle lever to enable adjustable positioning of the gripper to accommodate different sizes of retaining rings.

8. A retaining ring installation tool, comprising:

a handle lever having a first end and a second end with a slot between the first end and second end;

a compressing lever connected to the handle lever for movement between first and second positions with a portion slidably and pivotally connected in the slot of the handle lever, the compressing lever having a ring engaging surface for releasably receiving a portion of a retaining ring;

a link pivotally connected to the handle lever and operably connecting the compressing lever to the handle lever whereby when the compressing lever is moved relative to the handle lever from its first position toward its second position, the link slidably displaces the compressing lever in the slot to advance the ring engaging surface and compress the retaining ring; and the link is attached to the compressing lever by one pivot pin and to the handle lever by another pivot pin and an imaginary straight line is formed between the ring engaging surface and said another pivot pin so that when the compressing lever is in the second position, said one pivot pin passes from one side of the imaginary straight line to the other so that the compressing lever and the handle lever tend to remain in the second position.

9. The retaining ring installation tool of claim 1 wherein the link is disposed at an acute included angle relative to the handle lever when the compressing lever is in its first position.

10. The retaining ring installation tool of claim 9 wherein the slidable movement of the compressing lever in the slot is proportional to the cosine of the angle spanned by the link as the compressing lever moves from its first position to its second position.

11. A retaining ring installation tool, comprising:

a handle lever having a first end and a second end with a slot between the first end and second end;

a gripper carried by the handle lever and engageable with a sidewall of a cylinder to locate and anchor the tool relative to the cylinder;

a compressing lever connected to the handle lever for movement between first and second positions with a portion slidably and pivotally connected in the slot of the handle lever, the compressing lever having a ring engaging surface for releasably receiving a portion of a retaining ring; and a link pivotally connected to the handle lever and operably connecting the compressing lever to the handle lever whereby when the compressing lever is moved relative to the handle lever from its first position toward its second position, the link slidably displaces the compressing lever in the slot to advance the ring engaging surface and compress the retaining ring.

* * * * *